(12) United States Patent  
Liao

(10) Patent No.: US 9,081,198 B2  
(45) Date of Patent: Jul. 14, 2015

(54) LIQUID CRYSTAL LENS AND STEREO DISPLAY DEVICE

(71) Applicant: Shenzhen China Star Optoelectronics Technology Co., Ltd., Shenzhen, Guangdong (CN)

(72) Inventor: Qiaosheng Liao, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 44 days.

(21) Appl. No.: 14/127,488

(22) PCT Filed: Nov. 26, 2013

(86) PCT No.: PCT/CN2013/087818  
§ 371 (c)(1),  
(2) Date: Dec. 18, 2013

(65) Prior Publication Data  
US 2015/0138456 A1 May 21, 2015

(30) Foreign Application Priority Data  
Nov. 20, 2013 (CN) .......................... 2013 1 0584625

(51) Int. Cl.  
*G02F 1/1343* (2006.01)  
*G02B 27/22* (2006.01)

(52) U.S. Cl.  
CPC ...... *G02B 27/2214* (2013.01); *G02F 1/134327* (2013.01)

(58) Field of Classification Search  
CPC ........... G02G 27/2214; G02B 27/2214; G02F 1/134327  
USPC ..................................... 349/15, 201  
See application file for complete search history.

(56) References Cited

U.S. PATENT DOCUMENTS

2013/0257840 A1* 10/2013 Kim et al. ..................... 345/212

\* cited by examiner

*Primary Examiner* — James Dudek  
(74) *Attorney, Agent, or Firm* — Andrew C. Cheng

(57) ABSTRACT

An LC lens is provided, which includes a first substrate, a second substrate, and a liquid crystal layer interposed between the first substrate and the second substrate. A plurality of strips of electrode sets are disposed on the second substrate, and separately distributed along a first direction parallel to the second substrate. A common electrode is disposed on the first substrate and opposite to the plurality of strips of electrode sets. At least one slit electrode is disposed in an area of the common electrode aligned with one of the strips of electrode sets, and separate from the common electrode. A corresponding stereo display device is also provided. The light-concentrating property for displaying can be enhanced accordingly and the 3D displaying effect of the stereo display device for watching can be improved.

17 Claims, 4 Drawing Sheets

100

100

LIQUID CRYSTAL LENS AND STEREO DISPLAY DEVICE

CROSS REFERENCE TO RELATED APPLICATIONS

The present application claims priority to Chinese Patent Application No. 201310584625.2, filed Nov. 20, 2013, and entitled "a liquid crystal lens and stereo display device". The entire contents of the above-mentioned patent application are cited and incorporated herein for reference.

FIELD OF THE INVENTION

The present invention relates to a field of stereo display techniques, and more particularly to a liquid crystal lens and a stereo display device.

BACKGROUND OF THE INVENTION

Currently available stereo display devices are generally autostereoscopic displays, i.e. naked eyes three-dimensional (3D) displays. Principally, a beam splitter such as a liquid crystal (LC) lens is added to a two-dimensional (2D) display panel at a light exit so as to have an observer's left and right eyes differentially receive a binocular parallax image shown on a display panel. Combined in the observer's brain, stereo perception can be acquired.

The beam splitter, e.g. the LC lens, is generally fabricated with a lenticular lens array made of transparent material, and by way of refraction therethrough, light is emitted from different pixels in different polarizing directions so as to separate the parallax image. As shown in FIG. 1, which is a schematic diagram showing a structure of an LC lens according to prior art, LC molecules 110a and 120a corresponding to adjacent two strips of electrode sets 110 and 120 tilt in the same way, i.e. the pretilt angles are both 0°, if there is no voltage applied to the LC lens 100. Meanwhile, there is no difference in refraction index between the centers and the edges of the LC layers corresponding to the strip electrode sets 110 and 120, so what the user watches through the LC lens 100 is an image 20 free of parallax.

FIG. 2 is a schematic diagram showing titling configurations of LC molecules when a voltage is applied. Combined FIG. 1 and FIG. 2 show that when a certain voltage is applied to the LC lens 100, differences in refraction index occur between the centers and the edges of the LC layers corresponding to the strip electrode sets 110 and 120 due to the electric field distribution, and the phase distribution similar to a lens can be formed on the condition that a focusing mode is satisfied. Therefore, a user may see a binocular parallax image 20 through the LC lens 100, and a 3D image can be seen at an optimal observing distance.

Since the pretilt angles are the same, all the LC molecules in the LC layer 130 with voltage applied thereto, including LC moculaes 110a and 120a, would tilt along the distribution direction of the electric field. However, due to possible uneven distribution of the electric field and operational factors in practice, it is likely to result in asymmetric tilting of LC molecules corresponding to the two symmetric strip electrode sets 110 and 120. As shown in the figure, the tilting situation of the LC molecules indicated by the dash frames is disordered. As a result, there exists matching deviation between the Neff profile (curve of effective refraction index) L2 and the ideal Neff profile L (see FIG. 3), which deteriorates the light-concentrating property of the display device and thus adversely affects the 3D displaying effect for watching.

In view of the foregoing, there is a need to provide an LC lens and a stereo display device, which exempt from the above problems.

SUMMARY OF THE INVENTION

The present invention aims to solve the technical problems by providing an LC lens and a stereo display device with enhanced light-concentrating property for displaying, thereby improving the 3D displaying effect for watching.

In order to solve the above-mentioned technical problems, an LC lens is provided in an aspect of the embodiments according to the present invention, which includes a first substrate, a second substrate, and a liquid crystal layer interposed between the first substrate and the second substrate, wherein:

a plurality of strips of electrode sets are disposed on the second substrate, and separately distributed along a first direction parallel to the second substrate; and a common electrode is disposed on the first substrate and opposite to the plurality of strips of electrode sets, wherein at least one slit electrode is disposed in an area of the common electrode aligned with one of the strips of electrode sets, and separate from the common electrode.

In the embodiment, the slit electrode is produced by etching the common electrode.

In the embodiment, two slit electrodes are disposed in an area of the common electrode aligned with one of the strips of electrode sets, and the two slit electrodes and the common electrode are separate from one another.

In the embodiment, the voltages respectively received by the two slit electrodes in operation are different from each other, and are both higher than the voltage received by the common electrode in operation.

In the embodiment, the two slit electrodes have different widths and receive voltages higher than the voltage received by the common electrode in operation.

Correspondingly, another embodiment according to the present invention includes a first substrate, a second substrate, and a liquid crystal layer interposed between the first substrate and the second substrate, wherein:

a plurality of strips of electrode sets are disposed on the second substrate, and separately distributed along a first direction parallel to the second substrate; and a common electrode is disposed on the first substrate and opposite to the plurality of strips of electrode sets, wherein at least one slit electrode is produced by etching the common electrode and separate from the common electrode, and the voltage received by the slit electrode in operation is higher than the voltage received by the common electrode in operation.

In the embodiment, two slit electrodes are disposed in an area of the common electrode aligned with one of the strips of electrode sets, and the two slit electrodes and the common electrode are separate from one another.

In the embodiment, the voltages respectively received by the two slit electrodes in operation are different from each other, and are both higher than the voltage received by the common electrode in operation.

In the embodiment, the two slit electrodes have different widths and receive voltages higher than the voltage received by the common electrode in operation.

In the embodiment, each of the strips of electrode sets includes at least two layers of electrode strips, which are sequentially stacked and kept insulated from each other along a second direction perpendicularly to the second substrate, and the widths of the at least two layers of electrode strips gradually decrease in a direction toward the first substrate.

In the embodiment, one of the at least two layers of electrode strips is projected onto the second substrate within an area where another layer of electrode strips closer to the second substrate is projected.

Correspondingly, a further embodiment according to the present invention provides a stereo display device, and the stereo display device includes:

a display panel; and a liquid crystal lens, disposed at a light exit of the display panel;

wherein the liquid crystal lens comprises a first substrate, a second substrate, and a liquid crystal layer interposed between the first substrate and the second substrate, wherein:

a plurality of strips of electrode sets are disposed on the second substrate, and separately distributed along a first direction parallel to the second substrate; and a common electrode is disposed on the first substrate and opposite to the plurality of strips of electrode sets, wherein at least one slit electrode is produced by etching the common electrode and separate from the common electrode, and the voltage received by the slit electrode in operation is higher than the voltage received by the common electrode in operation.

In the embodiment, two slit electrodes are disposed in an area of the common electrode aligned with one of the strips of electrode sets, and the two slit electrodes and the common electrode are separate from one another.

In the embodiment, the voltages respectively received by the two slit electrodes in operation are different from each other, and are both higher than the voltage received by the common electrode in operation.

In the embodiment, the two slit electrodes have different widths and receive voltages higher than the voltage received by the common electrode in operation.

In the embodiment, each of the strips of electrode sets comprises at least two layers of electrode strips, which are sequentially stacked and kept insulated from each other along a second direction perpendicularly to the second substrate, and the widths of the at least two layers of electrode strips gradually decrease in a direction toward the first substrate.

In the embodiment, one of the at least two layers of electrode strips is projected onto the second substrate within an area where another layer of electrode strips closer to the second substrate is projected.

The present invention can be implemented with the following benefits.

The embodiments according to the present invention are provided with at least one slit electrode in an area of the common electrode corresponding to one of the strip electrode sets, and have the voltage received by the slit electrode in operation greater than the voltage received by the common electrode in operation. In this way, not only can the 2D/3D display switching be performed but also the matching between the practical Neff profile and the ideal Neff profile can be improved, thereby enhancing the light-concentrating property and improve the 3D display effect for watching.

BRIEF DESCRIPTION OF THE DRAWINGS

The embodiments or technical solutions of the present invention will be apparent from the following detailed descriptions with reference to the attached drawings. It is understood that the attached drawings are merely for illustrating the embodiments of the present invention, and for those ordinary in the art, further drawings can be derived from the attached drawings without inventive efforts. In the drawings.

DETAILED DESCRIPTION OF THE PREFERRED EMBODIMENTS

The following embodiments are described with reference to the attached drawings for exemplifying specific embodiments feasible according to the present invention. The expressions concerning directions in the application, e.g. "over", "under", "front", "back", "left", "right", "inside", "outside", "beside", etc., are defined by referring to the attached drawings. Therefore, the directions used herein are for illustrating and understanding the invention rather than limiting the invention.

Hereinafter, detailed descriptions of the invention are given with combined drawings and preferred embodiments.

Figure 4:
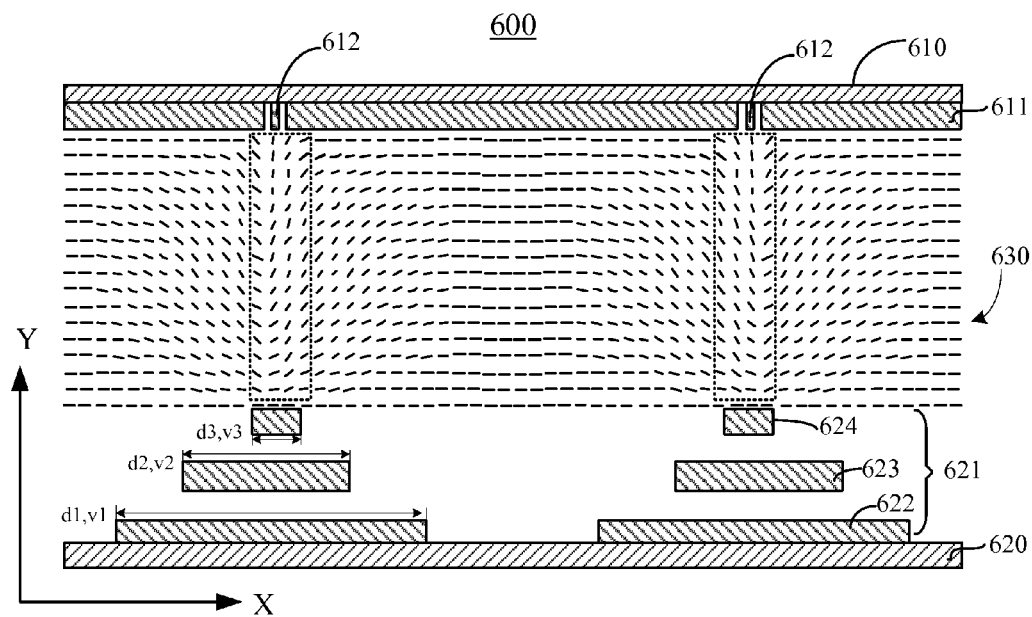
FIG. 4 is a schematic diagram illustrating an embodiment of an LC lens structure provided by the present invention.

FIG. 4 is a schematic diagram illustrating an embodiment of an LC lens structure provided by the present invention. As shown in FIG. 4, the LC lens 600 in this embodiment includes a first substrate 610 and a second substrate 620 disposed opposite to each other and an interposing LC layer 630.

In this embodiment, the second substrate 620 is disposed with a plurality of strips of electrode sets 621 separately distributed along a first direction X, wherein the first direction X is parallel to a horizontal direction that the second substrate 620 extends.

Each of the strip electrode sets 621 includes a first layer of electrode strips 622, a second layer of electrode strips 623 and a third layer of electrode strips 624, which are sequentially stacked and kept insulated from each other, wherein a second direction Y is perpendicularly to the horizontal direction that the second substrate 620 extends, and thus is perpendicularly to the first direction X. The width d1 of the first layer of electrode strips 622 is greater than the width d2 of the second layer of electrode strips 623, and the second layer of electrode strips 623 is projected onto the second substrate 620 within an area where the first layer of electrode strips 622 is projected. Likewise, the width d2 of the second layer of electrode strips 623 is greater than the width d3 of the third layer of electrode strips 624, and the third layer of electrode strips 624 is projected onto the second substrate 620 within an area where the second layer of electrode strips 623 is projected.

In this embodiment, a common electrode 611 corresponding to the strips of electrode sets 621 is disposed on the first substrate 610. The common electrode 611 is preferably an integral layer of indium tin oxide (ITO).

Figure 1:
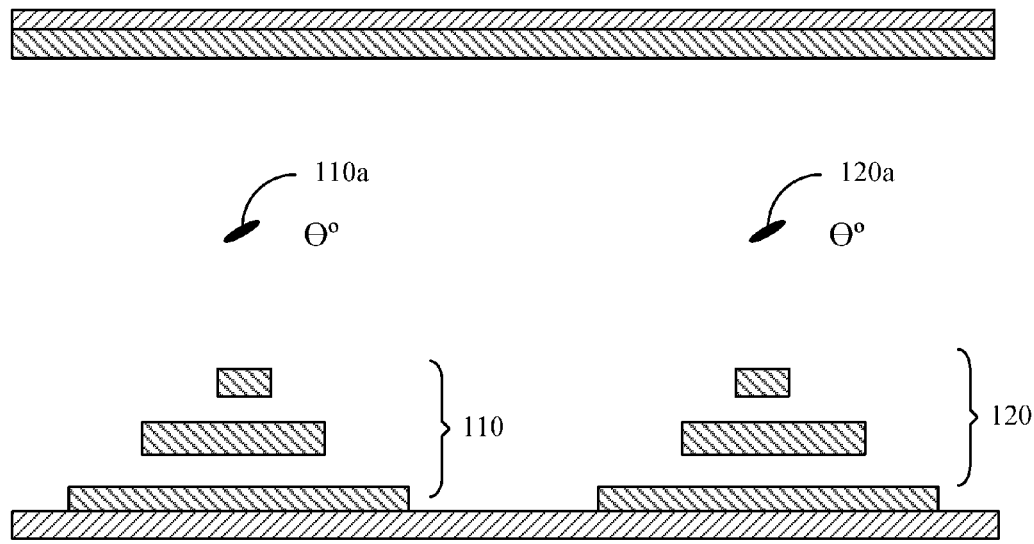
FIG. 1 is a schematic diagram illustrating a structure of an LC lens according to prior art.
Figure 2:
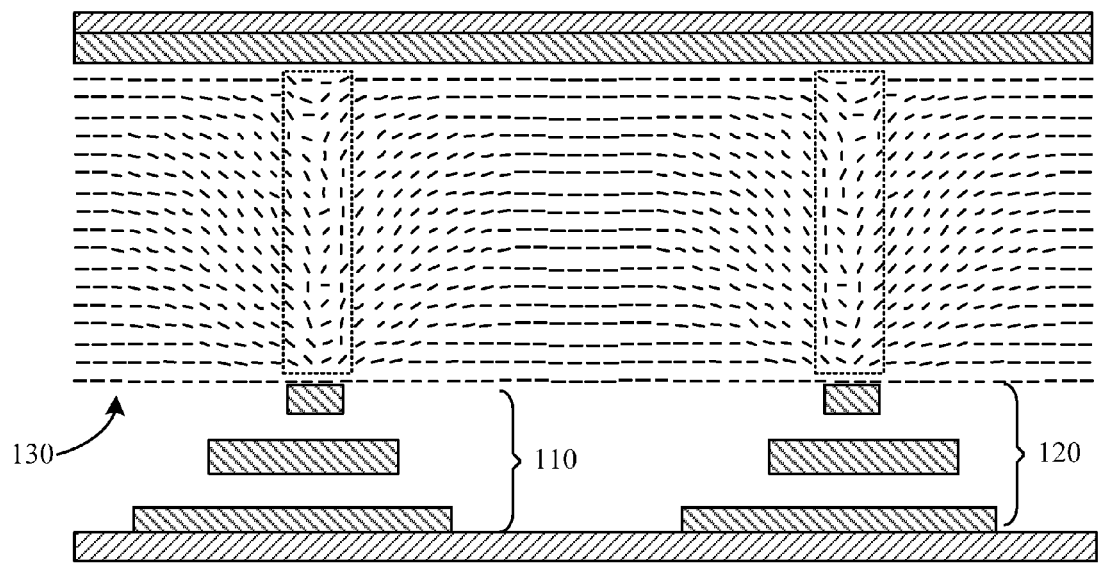
FIG. 2 is a schematic diagram illustrating tilting LC molecules on the condition that a voltage is applied to the LC lens of FIG. 1.

The above-mentioned common electrode 611 is disposed with at least one slit electrode 612 in an area aligned with one of the electrode sets 621. The slit electrode 612 is separate from the common electrode 611, and particularly, the slit electrode 612 can be produced by etching the common electrode 611. In operation, a voltage received by the slit electrode 612 is higher than that received by the common electrode 611. By applying a high voltage to the slit electrode 612, the region where the LC molecules irregularly tilt, as shown in FIG. 2, can be adjusted.

Figure 5:
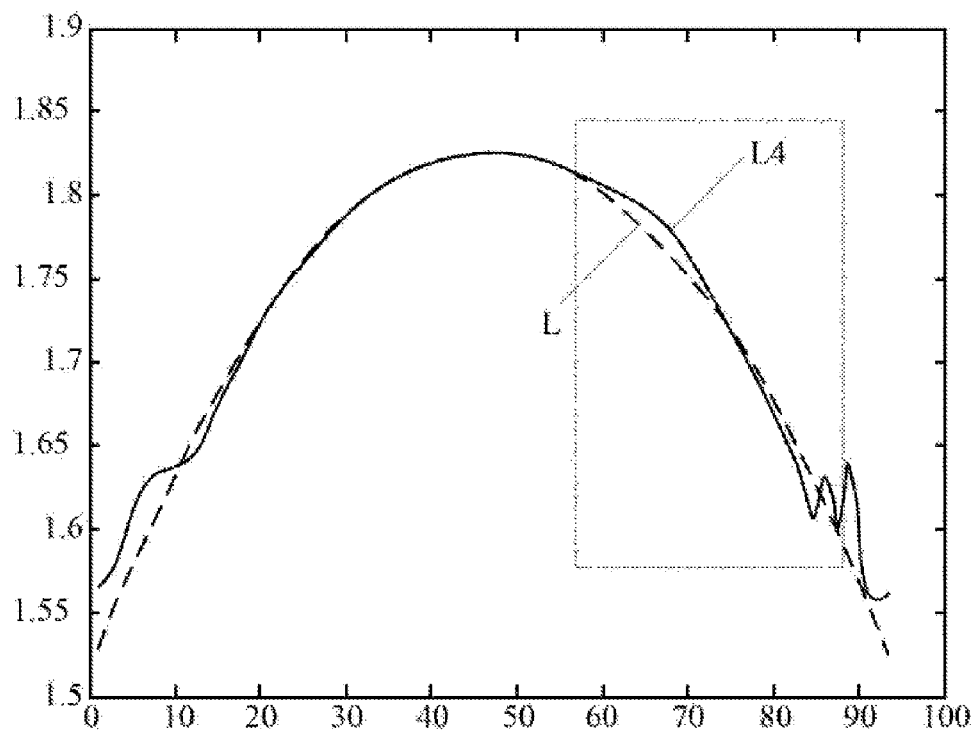
FIG. 5 is a practical Neff profile plot associated with the LC lens shown in FIG. 4.

FIG. 5 is a practical Neff profile plot associated with the LC lens shown in FIG. 4. Hereinafter, The operational principle and process of the LC lens according to this embodiment for 2D/3D display switching will be described with reference to combined FIG. 4 and FIG. 5.

Before applying any voltage to the LC lens 600, there is no difference in refraction index between the centers and the edges of the LC layers corresponding to the strip electrode sets 621, respectively. Therefore, no refraction would occur when light passes through the LC lens 600, and thus there would be no binocular parallax in the image.

With an operational voltage applied to the LC lens 600, the energy required for tilting LC molecules in the LC layer 630 is higher in the area closer to the LC layer 630, so the voltage V1 received by the first layer of electrode strips 622 is lower than the voltage V2 received by the second layer of electrode strips 623, and the voltage V2 received by the second layer of electrode strips 623 is lower than the voltage V3 received by the third layer of electrode strips 624. Meanwhile, under the interaction among the three layers of electrode strips and the common electrode 611, the LC molecules in the LC layer 630 tilt in a manner as shown in FIG. 2. If a higher voltage is applied to the slit electrode 612, the region where the LC molecules irregularly tilt, as shown by a dash frame in FIG. 4, can be adjusted. Accordingly, the specified LC molecules irregularly tilting as shown in FIG. 4 are made to tilt in an ideal tilting direction, thereby approximating the corresponding Neff profile L4 to ideal Neff profile L in a better way compared to the Neff profile L1 shown in FIG. 3 (see the specified dash frame shown in the drawing). As a result, the light-concentrating property can be improved so as to have an improved 3D effect for watching.

Figure 6:
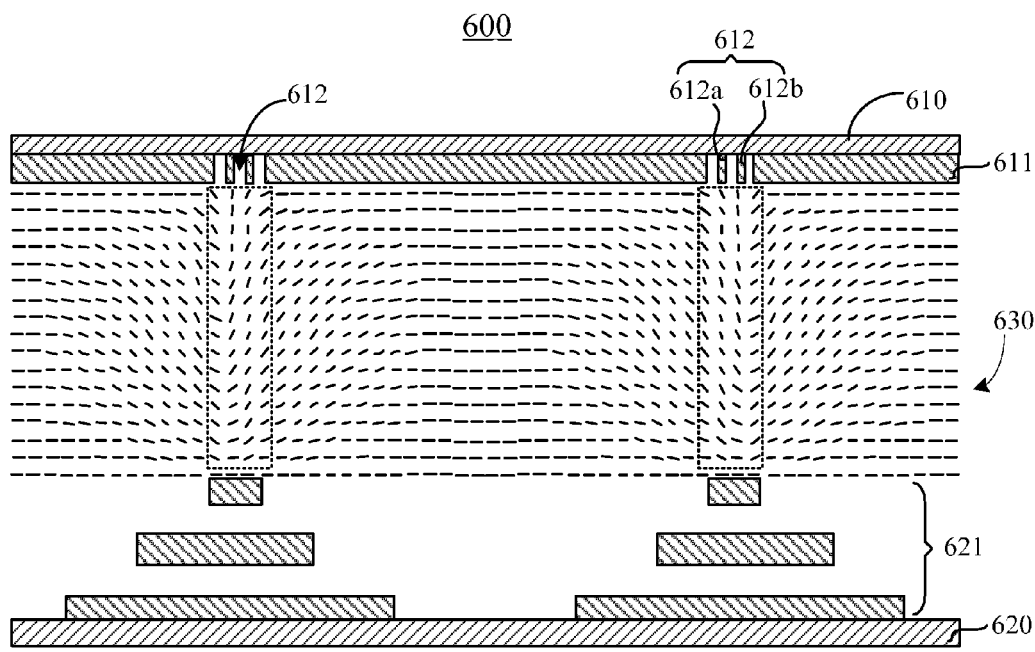
FIG. 6 is a schematic diagram illustrating another embodiment of an LC lens structure provided by the present invention.

FIG. 6 is a schematic diagram illustrating another embodiment of an LC lens structure provided by the present invention. The embodiment of LC lens 600 as shown in FIG. 6 differs from the LC lens 600 as shown in FIG. 4 in that there are two slit electrodes 612, e.g. a slit electrode 612a and a slit electrode 612b, disposed in the area of the common electrode and aligned with one of the strips of electrode sets 621 in this embodiment. The two slit electrodes and the common electrode 611 are separate from one another.

In the above, the two slit electrodes (612a and 612b) have substantially identical width, but receive different voltages in operation, which are higher than the voltage received by the common electrode 611 in operation.

It is understood that in other embodiments, the width of the two slit electrodes (612a and 612b) could be unequal, and the voltages respectively received in operation could be the same or different, both higher than the voltage received by the common electrode 611 in operation.

Figure 3:
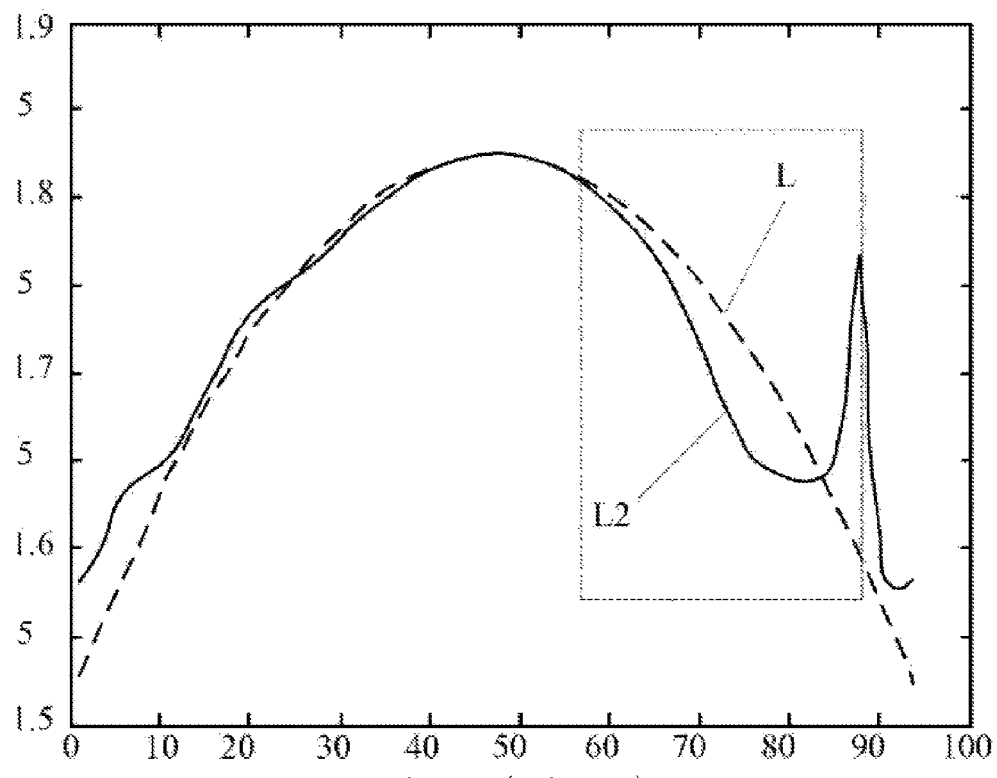
FIG. 3 is a practical Neff profile plot associated with the LC lens shown in FIG. 2.

In this embodiment, the LC molecules in the LC region 630 can be adjusted by way of the two slit electrodes (612a and 612b) so as to make the irregularly tilting LC molecules as shown by the dash frame in FIG. 6 to tilt in an ideal tilting direction, thereby approximating the corresponding Neff profile (not shown) to ideal Neff profile L in a better way compared to the Neff profile L1 shown in FIG. 3 (see the specified dash frame shown in the drawing). As a result, the light-concentrating property can be improved so as to have an improved 3D effect for watching With the use of two slit electrodes and the application of different voltages, the adjusting effect can be further improved and flexible.

It is to be further noted that ideal Neff profile L could not actually exist due to the uneven electric field and other operational factors. The ideal matching can only be done as close as possible by adjusting the width of at least one of the slit electrodes and the voltages based on practical conditions.

Figure 7:
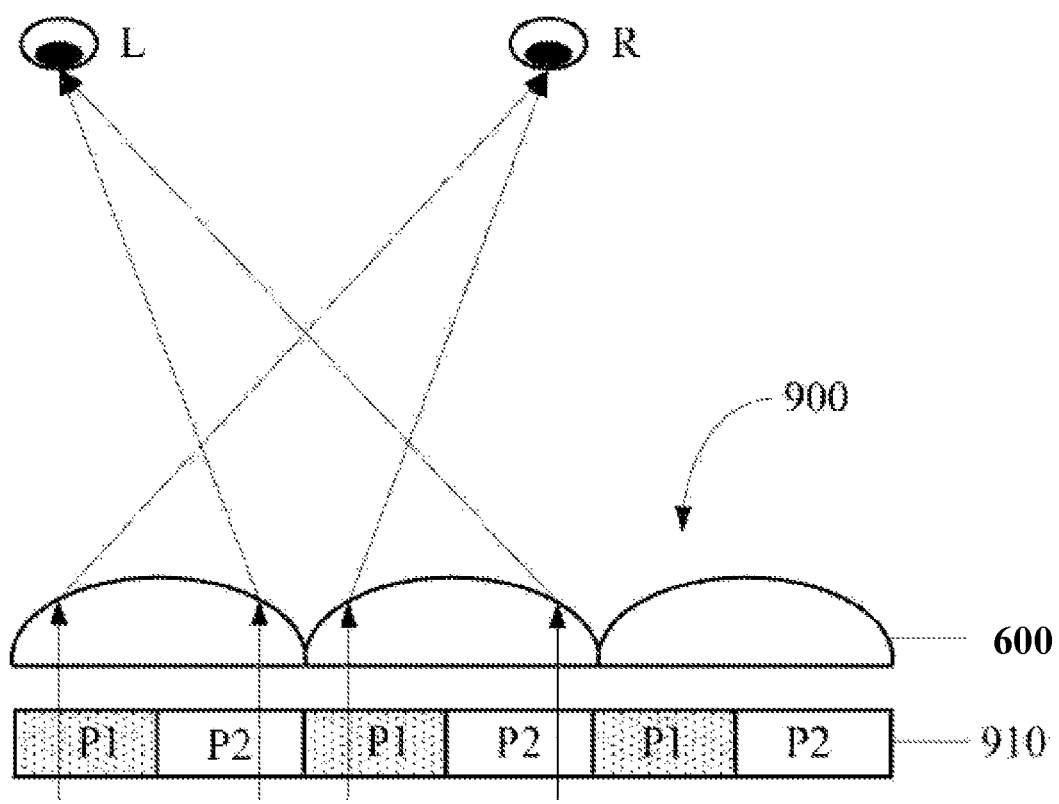
FIG. 7 is a schematic diagram illustrating an embodiment of a stereo display device provided by the present invention.

FIG. 7 is a schematic diagram illustrating an embodiment of a stereo display device provided by the present invention. As shown in FIG. 7, a stereo display 900 in this embodiment includes a display panel 910 and the LC lens 600 in any of the above embodiments, wherein the LC lens 600 is disposed at a light exit of the display panel 910.

If the LC lens 600 passes therethrough no electricity, what is shown in front of a user is a 2D image without binocular parallax;

Once electricity passes the LC lens 600, due to the refraction effect described in the above embodiments, light is emitted from different pixels P1 and P2 in the display panel 910 in different polarizing directions so as to have an observer's left eye L and right eye R differentially receive a binocular parallax image shown on the display panel 910 at an optimal watching distance. The images are combined in the observer's brain to acquire stereo perception of a 3D image.

As described above, the embodiments according to the present invention are provided with at least one slit electrode in an area of the common electrode corresponding to one of the strip electrode sets, and have the voltage received by the slit electrode in operation greater than the voltage received by the common electrode in operation. In this way, not only can the 2D/3D display switching be performed but also the matching between the practical Neff profile and the ideal Neff profile can be improved, thereby enhancing the light-concentrating property and improve the 3D display effect for watching.

Those disclosed above are only preferred embodiments according to the present invention and should not be used for limiting the scope of the invention. All the equivalent variations are considered within the scope of the invention.

What is claimed is:

1. A liquid crystal lens, comprising a first substrate, a second substrate, and a liquid crystal layer interposed between the first substrate and the second substrate, and characterized in that:
    a plurality of strips of electrode sets are disposed on the second substrate, and separately distributed along a first direction parallel to the second substrate; and
    a common electrode is disposed on the first substrate and opposite to the plurality of strips of electrode sets, wherein at least one slit electrode is disposed in an area of the common electrode aligned with one of the strips of electrode sets, and separate from the common electrode;
    wherein two slit electrodes are disposed in an area of the common electrode aligned with one of the strips of electrode sets, and the two slit electrodes and the common electrode are separate from one another.

2. The liquid crystal lens according to claim 1, wherein the voltage received by the slit electrode in operation is higher than the voltage received by the common electrode in operation.

3. The liquid crystal lens according to claim 1, wherein the slit electrode is produced by etching the common electrode.

4. The liquid crystal lens according to claim 1, wherein the voltages respectively received by the two slit electrodes in operation are different from each other, and are both higher than the voltage received by the common electrode in operation.

5. The liquid crystal lens according to claim 1, wherein the two slit electrodes have different widths and receive voltages higher than the voltage received by the common electrode in operation.

6. The liquid crystal lens according to claim 4, wherein each of the strips of electrode sets comprises at least two layers of electrode strips, which are sequentially stacked and kept insulated from each other along a second direction perpendicularly to the second substrate, and the widths of the at least two layers of electrode strips gradually decrease in a direction toward the first substrate.

7. The liquid crystal lens according to claim 6, wherein one of the at least two layers of electrode strips is projected onto the second substrate within an area where another layer of electrode strips closer to the second substrate is projected.

8. A liquid crystal lens, comprising a first substrate, a second substrate, and a liquid crystal layer interposed between the first substrate and the second substrate, and characterized in that:
a plurality of strips of electrode sets are disposed on the second substrate, and separately distributed along a first direction parallel to the second substrate; and
a common electrode is disposed on the first substrate and opposite to the plurality of strips of electrode sets, wherein at least one slit electrode is produced by etching the common electrode and separate from the common electrode, and the voltage received by the slit electrode in operation is higher than the voltage received by the common electrode in operation;
wherein each of the strips of electrode sets comprises at least two layers of electrode strips, which are sequentially stacked and kept insulated from each other along a second direction perpendicularly to the second substrate, and the widths of the at least two layers of electrode strips gradually decrease in a direction toward the first substrate.

9. The liquid crystal lens according to claim 8, wherein two slit electrodes are disposed in an area of the common electrode aligned with one of the strips of electrode sets, and the two slit electrodes and the common electrode are separate from one another.

10. The liquid crystal lens according to claim 9, wherein the voltages respectively received by the two slit electrodes in operation are different from each other, and are both higher than the voltage received by the common electrode in operation.

11. The liquid crystal lens according to claim 9, wherein the two slit electrodes have different widths and receive voltages higher than the voltage received by the common electrode in operation.

12. The liquid crystal lens according to claim 8, wherein one of the at least two layers of electrode strips is projected onto the second substrate within an area where another layer of electrode strips closer to the second substrate is projected.

13. A stereo display device, comprising:
a display panel; and
a liquid crystal lens, disposed at a light exit of the display panel;
wherein the liquid crystal lens comprises a first substrate, a second substrate, and a liquid crystal layer interposed between the first substrate and the second substrate, wherein:
a plurality of strips of electrode sets are disposed on the second substrate, and separately distributed along a first direction parallel to the second substrate; and
a common electrode is disposed on the first substrate and opposite to the plurality of strips of electrode sets, wherein at least one slit electrode is produced by etching the common electrode and separate from the common electrode, and the voltage received b the slit electrode in operation is higher than the voltage received by the common electrode in operation;
wherein two slit electrodes are disposed in an area of the common electrode aligned with one of the strips of electrode sets, and the two slit electrodes and the common electrode are separate from one another.

14. The stereo display device according to claim 13, wherein the voltages respectively received by the two slit electrodes in operation are different from each other, and are both higher than the voltage received by the common electrode in operation.

15. The stereo display device according to claim 13, wherein the two slit electrodes have different widths and receive voltages higher than the voltage received by the common electrode in operation.

16. The liquid crystal lens according to claim 14, wherein each of the strips of electrode sets comprises at least two layers of electrode strips, which are sequentially stacked and kept insulated from each other along a second direction perpendicularly to the second substrate, and the widths of the at least two layers of electrode strips gradually decrease in a direction toward the first substrate.

17. The liquid crystal lens according to claim 16, wherein one of the at least two layers of electrode strips is projected onto the second substrate within an area where another layer of electrode strips closer to the second substrate is projected.

* * * * *